UNITED STATES PATENT OFFICE.

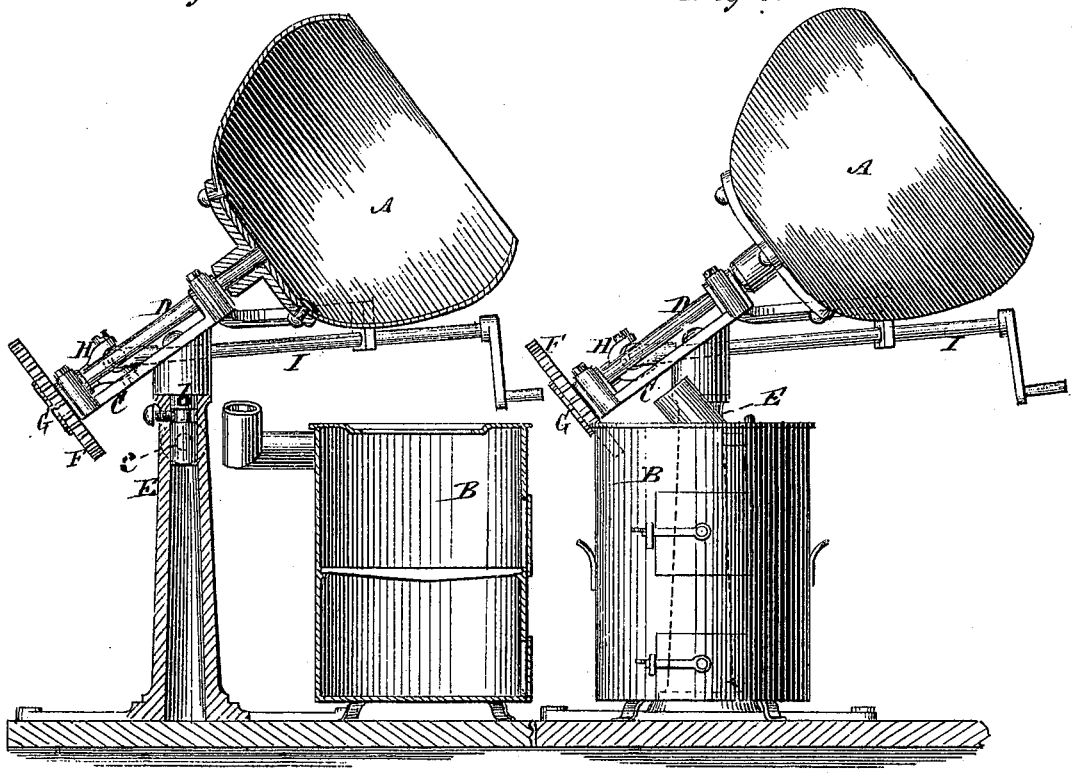

WILLIAM CAIRNS, OF JERSEY CITY, NEW JERSEY, ASSIGNOR TO HIMSELF AND THOMAS BURKHARD, OF NEW YORK, N. Y.

IMPROVEMENT IN APPARATUS FOR SUGAR-COATING CONFECTIONERY, PILLS, &c.

Specification forming part of Letters Patent No. 159,899, dated February 16, 1875; application filed December 30, 1874.

*To all whom it may concern:*

Be it known that I, WILLIAM CAIRNS, of Jersey City, county of Hudson, State of New Jersey, have invented certain new and useful Improvements in Machines for Sugar-Coating Confectionery, Pills, and other articles or substances; and I do hereby declare that the following is a full, clear, and exact description of the same, reference being had to the accompanying drawing forming part of this specification.

This invention relates to portable or other machines, designed to be operated by hand, for sugar-coating almonds and other confectionery; also, for sugar-coating pills and other articles or substances.

The invention consists in a combination, with a furnace or heater and swiveling pan, having attached gear for rotating it, of an operating-shaft provided with a universal joint or coupling for actuating said gear, and whereby not only may the operating-shaft be kept at a low and convenient elevation, and be made to clear the pan, but facility is afforded for rotating the pan at different positions and in different relations with the furnace.

Figure 1 is a vertical section of the machine as seen from the side, and with the pan as swiveled to lie over the furnace. Fig. 2 is a plan of the same, with the pan in like position relatively to the furnace; and Fig. 3, a front view, with the pan as swiveled to one side, back of the furnace.

A is the pan, which may be of the same shape as the ordinary steam-pan for the like purpose, and be set to revolve at an angle to the horizon, as usual in sugar-coating machines driven by hand or steam power. In the present machine, however, which is designed to be portable, or to be operated by hand, instead of the pan A being surrounded by a steam-coil, it is heated by a stationary heater or furnace, B, beneath the pan, and to provide for regulating its exposure to the heat it is made capable of swiveling more or less away from the fire, or across and over it, whereby the heat may be tempered almost, if not quite, as effectually as by admitting or shutting off the steam in a steam-pan for the like purpose. To this end the stand or bracket C, which carries the inclined shaft D of the pan, is fitted to swivel or turn by a pivot, *b*, within or on an upright, E, back of the furnace, and may be held, if desired, by a set-screw, *c*, to occupy any fixed position relatively to the furnace. Thus the pan A may either be adjusted over the furnace, as in Figs. 1 and 2, or to one side and back of it, as in Fig. 3; or it may be swiveled backward and forward while in operation, over the fire.

These adjustments not only provide for filling and emptying the pan, but to temper the heat.

In order that the pan may be rotated in all or varied positions of its adjustment relatively to the furnace the gear by which it is rotated is carried by the swiveling stand or bracket C of the pan. Furthermore, in order that such gear may be as simple and compact as possible, and to provide for the operator standing in front of the pan to facilitate his inspection of the work and manipulation of the articles under treatment, also the introduction of the sugar from time to time as reqired, I elect to use only a single gear-wheel, F, and pinion G, and to couple the shaft of the operating-pinion G, by a universal joint, H, with a shaft, I. Said shaft may thus be set horizontally, or at a different inclination from that of the axes of the gears, and be projected in front without striking or interfering with the pan, and without inconveniently elevating the crank by which such shaft is operated. Other mechanism, however, might be employed for rotating the swiveling-pan.

I claim—

The combination, with the gears F G, of the operating-shaft I, the universal joint or coupling H, the swinging or swiveling rotating pan A, and the fixed or stationary furnace B, substantially as shown and described.

WM. CAIRNS.

Witnesses:
 BENJ. W. HOFFMAN,
 MICHAEL RYAN.